US008177685B2

(12) United States Patent
Leibbrandt et al.

(10) Patent No.: US 8,177,685 B2
(45) Date of Patent: May 15, 2012

(54) METHOD FOR SHIFTING GEARS IN A DUAL CLUTCH TRANSMISSION

(75) Inventors: Martin Leibbrandt, Bedburg (DE); Harald Schmitz, Dortmund (DE); Marco Siebigteroth, Hennef (DE)

(73) Assignee: Getrag Ford Transmissions GmbH, Cologne (DE)

( * ) Notice: Subject to any disclaimer, the term of this patent is extended or adjusted under 35 U.S.C. 154(b) by 762 days.

(21) Appl. No.: 12/274,284

(22) Filed: Nov. 19, 2008

(65) Prior Publication Data

US 2009/0137363 A1      May 28, 2009

(30) Foreign Application Priority Data

Nov. 26, 2007     (DE) .......................... 10 2007 057 205

(51) Int. Cl.
*B60W 10/04*     (2006.01)
(52) U.S. Cl. ........................................ 477/109; 477/181
(58) Field of Classification Search ................... 477/70, 477/83, 84, 107, 109, 115, 180, 181
See application file for complete search history.

(56) References Cited

U.S. PATENT DOCUMENTS

| 7,086,989 | B2 * | 8/2006 | Siebigteroth et al. | ......... 477/109 |
| 7,351,183 | B2 * | 4/2008 | Fujii et al. | ..................... 477/109 |
| 7,722,499 | B2 * | 5/2010 | Soliman et al. | .................... 477/5 |
| 7,840,329 | B2 * | 11/2010 | Katakura et al. | ................ 701/61 |
| 2007/0117677 | A1 * | 5/2007 | Ayabe et al. | .................. 477/115 |

FOREIGN PATENT DOCUMENTS

EP             1 507 103        2/2005

\* cited by examiner

*Primary Examiner* — Justin Holmes
(74) *Attorney, Agent, or Firm* — Schlee IP International, P.C.; Alexander R Schlee (57) ABSTRACT

A method for shifting gears in a dual clutch transmission within a motor vehicle and a motor vehicle implementing said method are suggested providing a smooth transition between gears particularly in the starting phase. The dual clutch transmission comprises a first clutch and a second clutch as well as a first partial transmission having a first and other gears and a second partial transmission having a second and other gears. The clutches are controlled to a) decrease a torque transmitting capacity of the first clutch; b) increase a torque transmitting capacity of the second clutch; c) adapt the rotational speed of the motor in direction of a rotational speed of an input shaft of the second partial transmission via increasing the torque transmitting capacity of the second clutch; and d) control the torque transmitting capacity of the second clutch to a final torque value.

19 Claims, 5 Drawing Sheets

Fig. 6 ns of comfort, the shifting process should stretch over a longer time period and is therefore in particular sensitive against changing gas pedal positions that occur in particular in a low speed and low load range during the starting process. Further, in the method as described above, no gear shifting can be conducted when the rotational speed of the input shaft of the second partial transmission is below the idle rotational speed of the motor. This prevents shifting into higher gears at an early stage that is desirable in case of low acceleration pedal positions due to the typical big transmission steps.

METHOD FOR SHIFTING GEARS IN A DUAL CLUTCH TRANSMISSION

CROSS REFERENCE TO RELATED APPLICATION

This application claims the priority right from the German patent application DE 102007057205.2 that was filed on Nov. 26, 2007, the content of which is herewith incorporated in its entirety by reference.

BACKGROUND OF THE INVENTION

The invention relates to a method for shifting gears in a dual clutch transmission within a motor vehicle comprising a first clutch and a second clutch as well as a first partial transmission and a second partial transmission, wherein the first partial transmission comprises the first clutch and a first group of gears and the second partial transmission comprises the second clutch and a second group of gears.

For dual clutch transmission shifting or changing gears is typically conducted by two types of methods: In the pull-up and push-back shifting at first a target gear is engaged in a second partial transmission that is not supposed to transmit any torque prior to shifting. Thereafter, the applied motor torque is transmitted according to a predetermined motor load from the first clutch to the second clutch. During this action, the second, passive clutch is controlled under slippage such that the rotational speed of the motor equals to the rotational speed of an input shaft of the first partial transmission. Subsequently, the rotational speed of the motor is controlled to rotate at the rotational speed of an input shaft of the second partial transmission by reducing of the motor torque and controlling the torque transmitting capacity of the second clutch. Thereafter, the second clutch can be closed completely. Such a control of the torque transmitting capacity of the first and second clutches as well as the subsequent adaption of the rotational speed of the motor to the rotational speed of the second input shaft of the second partial transmission is disclosed in the EP 1 507 103 B1.

For the pull-back and push-up shifting the sequence of the torque transmissions steps (decreasing of the torque transmitting capacity of the first clutch while simultaneously increasing the torque transmitting capacity of the second clutch) is reversed: At first, the first clutch is brought into a slippage operational mode and the rotational speed of the motor is increased to the rotational speed of the input shaft of the second partial transmission. Prior to this action and during this action, the target gear is engaged in the second partial transmission. As soon as the rotational speed of the motor equals to the rotational speed of the input shaft of the second partial transmission, the torque is transferred from the first clutch (that is still active) to the second clutch (up to now passive clutch) and the shifting process is terminated.

These shifting methods have two limitations making these appear disadvantageous during the starting process of the vehicle: On the one hand, these methods work best when the rotational speed of the motor is between the rotational speeds of the two input shafts, on the other hand, this shifting method is very sensitive against changing motor torques or motor loads (for example due to changing acceleration pedal positions).

During the starting process, the rotational speed of the motor is typically above the rotational speed of the two input shafts of the partial transmission wherein typically a first forward gear on the one hand and a second forward gear of the vehicle on the other hand are preselected. Moreover, for rea-

SUMMARY OF THE INVENTION

It is an object of the invention to enhance the method for shifting the dual clutch transmission during the starting phase of the vehicle.

The method according to the invention provides that the adaption of the rotational speed of the motor is conducted via increasing the torque transmitting capacity of the second clutch, wherein the torque transmitting capacity of the second clutch is guided to a final torque value wherein a starting characteristic depending on the target gear and the rotational speed of the motor intersects with a motor characteristic at a particular motor load. For the gear shifting, the driving strategy is used that is implemented by the starting characteristic of the target gear. In this starting characteristic the torque that can be transmitted or the torque capacity of the second clutch is determined dependent on the rotational speed of the motor (and/or possibly of the velocity of the vehicle). This dependency differs for a second (forward) gear of the dual clutch transmission in the second partial transmission in comparison to the first (forward) gear of the dual clutch transmission in the first partial transmission, namely in a useful manner in that for the same clutch torque in the higher gear a lower rotational speed of the motor is required. Therefore, the starting characteristic of the second gear comprises a higher torque at the same rotational speed of the motor than the starting characteristic of a first gear.

Preferably, the starting characteristics that depend on the target gear increases continuously with an increase of the rotational speed of the motor and comprises in an intersection point with the motor characteristic a higher gradient than the motor characteristic. This makes sure that during the increase of the torque transmitting capacity in the second clutch the motor reaches safely the rotational speed where the starting characteristic of the target gear and the motor characteristic intersect at a predetermined motor load. In this connection it should be noted that during the shifting process the motor load may change due to a change in the pedal position. In this case, the predetermined motor load equals to the momentary motor load.

Simultaneously with the increase in the torque transmitting capacity of the second clutch a decrease in the torque transmitting capacity of the first clutch is conducted, wherein preferably the torque transmitting capacity of the first clutch is guided to a value 0 starting from a starting torque value where a starting characteristics that depends on the starting gear and the rotational speed of the motor intersects the motor characteristic for a predetermined motor load. This means that also for the starting gear a starting characteristic is stored that determines the torque transmitting capacity of the first clutch for the starting phase depending on the rotational speed of the motor. After the starting phase, the torque transmitting capacity of the first clutch can also assume values differing from 0, wherein in that case only very small torques are transmitted. For control purposes, it might be desirable that the particular clutch operating in its passive mode nevertheless comprises a small torque transmitting capacity.

Preferably, the starting characteristic that depends on the starting gear (i.e. the starting characteristic of the starting gear) increases continuously with increasing rotational speed of the motor and has a higher gradient in the intersecting point with the motor characteristic than the gradient of that motor characteristic. By means of this continuously increasing starting characteristic, the defined intersection point with the motor torque characteristic and the ratios of the gradients in the intersection points (the starting characteristic comprises in the intersecting point a higher gradient than the motor characteristic) a stable and clearly defined adaption of the rotational speed of the motor is accomplished when the torque transmitting capacity of the first clutch is decreased and the torque transmitting capacity of the second clutch is increased.

Preferably, the rotational speed of the motor is higher at the start of the shifting process than the rotational speed of an input shaft of the first partial transmission.

If during the starting phase a shifting action is requested (the rotational speed of the motor is higher than the rotational speed of the input shaft of the first partial transmission), the motor torque is blended over from the first clutch to the second clutch. Due to the starting characteristic the rotational speed of the motor torque is automatically adapted so that during this shifting action shifting of the torque from the first clutch to the second clutch and adapting the rotational speed of the motor are conducted simultaneously. Since the starting characteristics are robust vs. a change of the pedal position also the shifting of the torque and the torque distribution resulting therefrom is robust so that also during the shifting action a changing motor torque can be accepted. Likewise, the shifting can be easily reversed by reversing the shifting of the torque.

The torque transmitting capacity of the second clutch can equal to the product of a final torque value with an increasing function $F_{Auf}$ that starts with the value 0 and ends in the value 1. The torque transmitting capacity of the first clutch can equal to the product from a torque starting value and a reduction function $F_{Ab}$ that starts with the value 1 and ends in the value 0. The increasing function and/or the reduction function may depend in a linear fashion from the rotational speed of the motor or the time. According to a preferred embodiment, the relation is defined by $F_{Ab}=1-F_{Auf}$. A further possibility is to provide the torque transmitting capacities of the first and second clutch each with an own function or an own factor wherein both factors are in an appropriate manner opposite to each other so that blending over the clutch torques is possible. This allows to compensate delays in the system reaction by compensating by means of the characteristics of the factors. The functions $F_{Auf}$ and $F_{Ab}$ can be as described above linear or variable over a characteristic field or a characteristic function. These can be dependent on the time, the speed of the vehicle, the rotational speed of the motor torque and/or depend on the target motor torque or the torque requested by the driver. It is also possible that these influencing parameters influence each other (for example a characteristic depending on time where the time for blending over depends on the request by the driver).

The shape of the two starting characteristics can depend on the torque characteristic of the motor torque and the dependency of this characteristic from a chosen gear. For providing the same acceleration of the vehicle after gear shifting, the motor torque in the second gear at a desired rotational speed after the gear shifting has to be higher by a factor determined by the ratio of the gear transmission rates than in the first gear at the starting rotational speed. This does typically not equal to the characteristic that is normally required for a gear shifting, wherein the rotational speed as well as the torque change stand after shifting in correlation determined by the ratio of the transmission rates of the gears.

During the adapting process adapting the rotational speed of the motor a motor intervention for compensating the influence of torque due to inertia is conducted following from deceleration of the motor. Since blending over typically takes longer than in the case of gear shifting as known from prior art the motor intervention can be much less.

Preferably, a decrease of the torque transmitting capacity of the first clutch is terminated before the rotational speed of the motor falls below the rotational speed of the input shaft of the first partial transmission, since otherwise a biasing state is created where the input shaft of the first partial transmission is not accelerated further, but would be decelerated. This biasing situation is, however, at a low torque very low so that a significant overlap can be accepted. For example, according to one embodiment of the invention, in case of low pedal positions and therefore low torques it is admissible to have a blending over function of up to 50% after the rotational speed of the motor has fallen below the rotational speed of the input shaft of the first partial transmission without experiencing a significant decrease in the driving comfort.

Higher overlapping rates can be achieved if the motor torque is increased according to the biasing state. If, for example, the motor torque is 50 Nm, the torque transmitting capacity of the first clutch still 30 Nm and the torque transmitting capacity of the second clutch 45 Nm (where the step between gears, i.e. the ratio of the gear transmission rates is 1.5), by increasing the motor torque and the torque transmitting capacity of the second clutch by 45 each, a biasing state in case of falling below the rotational speed of the input shaft of the first partial transmission is compensated. Since in the course of adapting the rotational speed also the torque of the first clutch is increased, in parallel also an overcapacity of the torque from the motor and of the second clutch can be decreased. This method is in particular recommended if based on outside influences (for example driving into an inclined road) shifting gears enter into the biasing range due to changing circumstances. By respective motor intervention the gear shifting action can be performed up to its final end without sacrificing comfort.

If at the beginning of the shifting process the rotational speed of the motor equals the rotational speed of the input shaft of the second partial transmission, the torque transmitting capacity of the second clutch can be guided at constant or non-adapted rotational speed of the motor to an intermediate value from that the torque transmitting capacity of the second clutch is guided further to the final torque value of the starting characteristic and the rotational speed of the motor is adapted to the rotational speed of the input shaft of the second partial transmission. In this embodiment, analog to the normal pull-up shifting, blending over the torque to the second clutch is conducted first, wherein the torque of the second clutch serves for controlling the rotational speed of the motor torque. This results in shifting the torque onto the second clutch while the rotational speed ratios remain the same. As the next step, an increase of the torque transmitting capacity according to the starting characteristic of the second clutch is conducted. In this case, the intermediate value of the torque transmitting capacity of the second clutch that is decreased with the reduction function $F_{Ab}$ cannot be controlled by the rotational speed of the motor but has to be kept constant and can only be influenced by the estimated motor torque. This achieves adapting the rotational speed and the torque to the starting characteristic of the second clutch.

As a summary, the present invention achieves a method for gear shifting a dual clutch transmission wherein blending over the torque transmittal from the first clutch to the second clutch takes place simultaneously with adapting the rotational speed of the motor since a blending over from the starting characteristic of the starting gear to the starting characteristic of the target gear is achieved by applying the functions (increasing function $F_{Auf}$, decreasing function $F_{Ab}$). Throughout most of the time needed for conducting the shifting action the rotational speed of the motor torque is higher than the rotational speeds of the two input shafts of the dual clutch transmission.

During shifting from a non-slipping or carrying first clutch to a slipping second clutch according to the invention at first a blending over of a torque without adapting the rotational speed of the motor can be performed, wherein during the subsequent adaption of the rotational speed of the motor also the torque transmitting capacity of the second clutch is adapted to the final torque transmitting value according to the starting characteristic.

BRIEF DESCRIPTION OF THE DRAWINGS

In the following, the invention is described in more detail by referring to the embodiments shown in the drawings. In the drawings show.

DETAILED DESCRIPTION OF THE DRAWINGS

Figure 1:
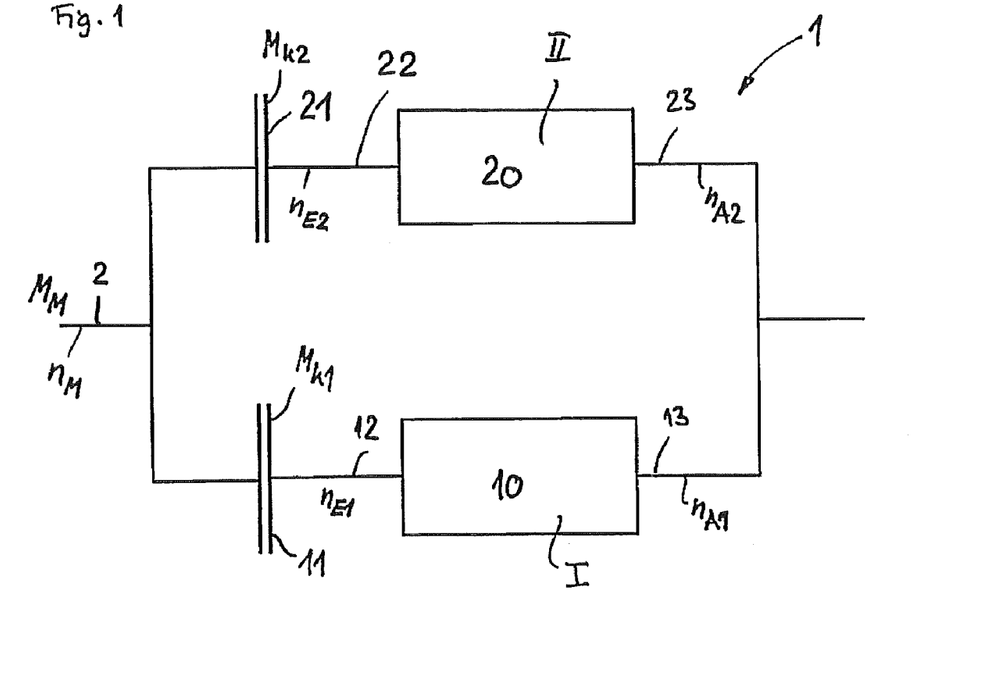
FIG. 1 the schematic structure of a dual clutch transmission.

FIG. 1 shows a schematic structure of a dual clutch transmission that is denoted with reference numeral 1 in its entirety. The dual clutch transmission 1 comprises a first partial transmission 10 and a second partial transmission 20. A first clutch 11 is assigned to the first partial transmission 10, while a second clutch 21 is assigned to the second partial transmission 20. By means of the first clutch 11 a rotation is transmitted from a crankshaft 2 of a motor that is not shown here to the input shaft 12 of the first partial transmission 10. When the clutch 11 is fully closed, a rotational speed $n_M$ of the motor or the crankshaft 2 equals a rotational speed $n_{E1}$ of the input shaft 12. In analogy the second clutch 21 can connect the crankshaft 2 with the input shaft 22 of the second partial transmission 20 so that the rotational speed $n_M$ of the motor equals to the rotational speed $n_{E2}$ of the input shaft 22.

A first group of gears is assigned to the first partial transmission 10 comprising also a first (forward) gear I of the dual clutch transmission 1. Typically, additional odd numbered forward gears are assigned to the partial transmission 10 but are not discussed further in the following. A second group of gears is assigned to the second partial transmission 20, comprising a second (forward) gear II. Additional forward gears of the second partial transmission (20) will not be discussed in further detail.

An output shaft 13 of the first partial transmission 10 rotates with a rotational speed $n_{A1}$, wherein a ratio of the rotational speeds $n_{A1}$ to $n_{E1}$ depends on the gear that has been engaged in the first partial transmission 10. In analogy to the first partial transmission 10 also the second partial transmission comprises an output shaft 23 that rotates with a rotational speed $n_{A2}$. The rotational speed $n_{A2}$ can be determined by the rotational speed $n_{E2}$ of the input shaft 22 and the transmission ratio of the second partial transmission (20) in the respective gear that has been engaged. The output shafts 13, 23 are coupled to each other by means of a joint driving unit (not shown) so that the rotational speeds $n_{A1}$ and $n_{A2}$ are equal or at least stand in a predetermined ratio with respect to each other.

Figure 2:
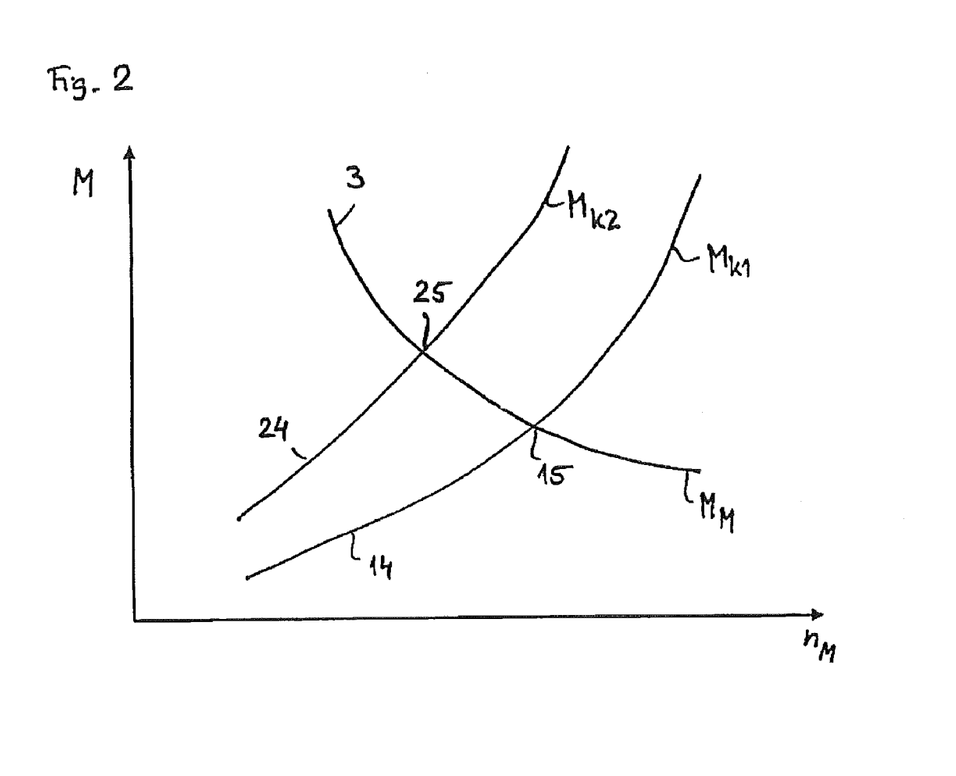
FIG. 2 starting characteristics of a first gear and a second gear as well as a motor characteristic.

The torque transmittal capacity or the maximum clutch torque $M_{k2}$ that can be transmitted by the first clutch 11 can be adjusted via a starting characteristic 14 as it is shown in FIG. 2 dependent on the rotational speed $n_M$ of the motor. The starting characteristic 14 of FIG. 2 increases continuously with increasing rotational speed $n_M$ of the motor. If a motor torque $M_M$ is higher than the torque transmitting capacity or transmittable clutch torque $M_{k1}$ the first clutch 11 transmits exactly that clutch torque $M_{k1}$ to the input shaft 12 of the partial transmission 10.

FIG. 2 further shows a starting characteristic 24 showing the dependency of the maximum transmittable clutch torque $M_{k2}$ dependent on the rotational speed $n_M$ of the motor. As can be seen in FIG. 2, the second clutch 21 can transmit a higher torque at the same rotational speed of the motor compared to the first clutch 11. The starting characteristics 14, 24 depend on the engaged gear I, II of the respective partial transmission 10, 20. If for instance in the first partial transmission 10 a different forward gear than the first forward gear is engaged, a completely different dependency of the clutch torque $M_{k1}$ for the first clutch 11 can be stored.

Besides the starting characteristics 14, 24 FIG. 2 also shows a motor torque characteristic $M_M$ for a particular motor load (for example 40% of the full motor load) or at a particular motor torque $M_M$. The motor characteristic 3 intersects the starting characteristics 14, 24 in intersecting points 15, 25. In intersecting point 15 the gradient of the starting characteristic 14 is higher than the gradient of the motor torque characteristic 3. The same applies for the intersecting point 25.

Figure 3:
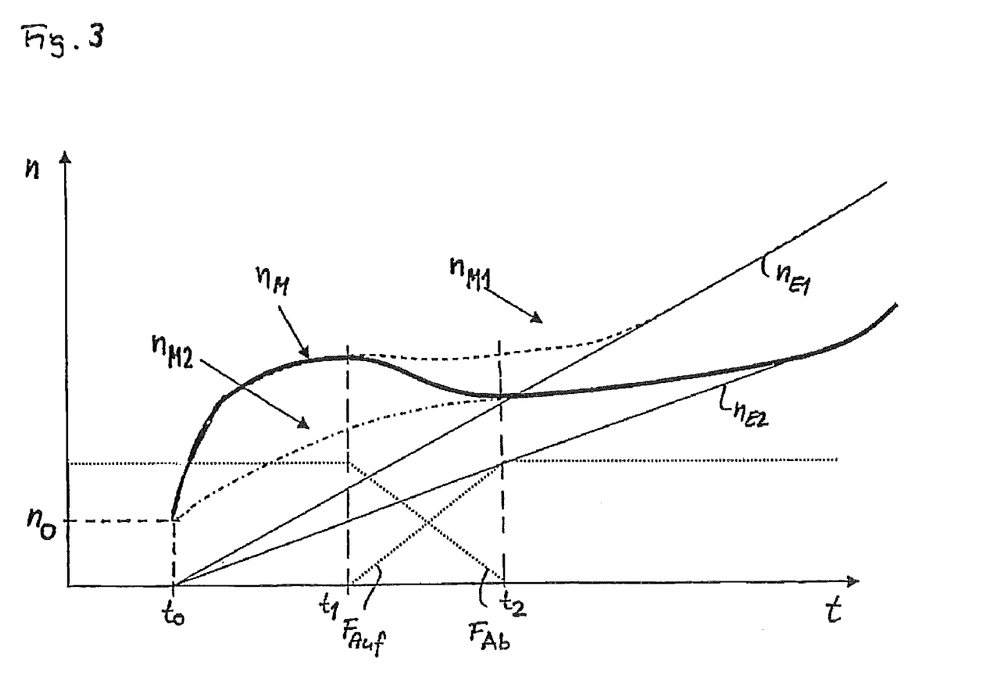
FIG. 3 various rotational speed characteristics during a gear shifting action according to a first embodiment.

FIG. 3 shows the various graphs demonstrating the rotational speed over the time t for a gear shifting action according to the invention from the first gear to the second gear. At the time $t_0$ the vehicle stands still and the motor rotates with the idle rotational speed $n_0$ when the first gear I has been engaged and a particular motor load has been established so that the rotational speed $n_M$ of the motor (bold solid line) increases from the time $t_0$. According to the starting characteristic 14 (compare FIG. 2) the clutch torque $M_{k1}$ of the first clutch 11 that can be transmitted increases with an increasing rotational speed $n_M$ of the motor so that of the vehicle is accelerated further and the rotational speed $n_{E1}$ of the input shaft 12 increases. With an increasing rotational speed $n_M$ of the motor also the transmitted clutch torque $M_{k1}$ increases so that the vehicle is accelerated further. The graph demonstrating the rotational speed $n_M$ of the motor extends along a characteristic $n_{M1}$ (dotted line) that approaches with progressing time the rotational speed $n_{E1}$. The characteristic $n_{M1}$ therefore indicates the characteristic of the rotational speed $n_M$ of the motor if during the starting process the vehicle is not gear shifted and the vehicle is accelerated in the first gear until the rotational speed $n_M$ of the motor torque equals to the rotational speed $n_{E1}$ of the first input shaft 12 and the clutch 11 works without any slippage.

In the present case, however, during the starting process, the gears are shifted from the first gear I into the second gear II. For this purpose, at a time $t_1$ the clutch torque of the first clutch 11 is reduced according to a reduction function $F_{Ab}$ while at the same time the clutch torque $M_{k2}$ of the second clutch 21 is increased via an increasing function $F_{Auf}$. The increasing function $F_{Auf}$ and the reduction function $F_{Ab}$ are functions that stand in a linear dependency from time t wherein its gradients are chosen such that these functions assume after a further time $t_2$ the value 0 (counts for the reduction function $F_{Ab}$) or the value 1 (counts for the increasing function $F_{Auf}$). By means of these functions $F_{Auf}$, $F_{Ab}$ the clutch torque $M_{k1}$ of the first clutch is reduced starting from a starting value of the torque that is applied at the time $t_1$ to the first clutch 11 to the value 0. By means of the increasing function $F_{Auf}$ the clutch torque $M_{k2}$ of the second clutch 21 is increased starting from the value 0 at the time $t_1$ to a value $M_{k2}$ that equals to that torque at which the starting characteristic 24 dependent on the rotational speed of the motor intersects with the motor characteristic 3 in the second gear at a particular motor load. Accordingly, the rotational speed $n_M$ merges at the time $t_2$ with the characteristic $n_{M2}$ standing for the rotational speed of the motor if only the second gear would be used for the starting process. At this time $t_2$ also the rotational speed $n_M$ of the motor intersects with the rotational speed $n_{E1}$ of the first input shaft 12. This means that the motor would rotate slower than the first input shaft 12. If the first clutch 11 would continue transmitting a torque after the time $t_2$ the motor would decelerate the input shaft 12 while driving the second input shaft 22 via the second clutch 21. This would result in a biasing of the dual clutch transmission that, however, within certain limits can be accepted without affecting the comfort. If a higher biasing occurs, this can be compensated by increasing the motor torque $M_M$.

Figure 4:
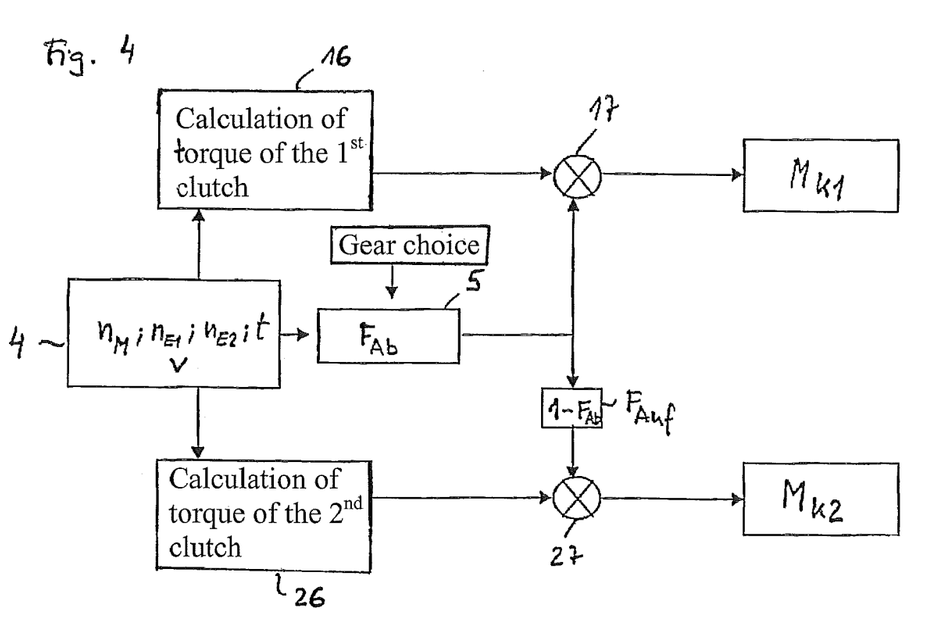
FIG. 4 a block diagram according to the first embodiment.

FIG. 4 shows a flow diagram for calculating the torque transmitting capacity or the clutch torques $M_{k1}$ and $M_{k2}$ of the clutches 11, 21. In the block 16 the clutch torque of the first clutch is calculated according to the starting characteristic 14 (compare with FIG. 2). The clutch torque depends on the rotational speed $n_M$ of the motor but can also depend on additional factors such as the rotational speed $n_{E1}$ of the input shaft 12, the rotational speed $n_{E2}$ of the second input shaft 22, the time t and the speed v of the vehicle. In an analog manner calculation of the torque according to the starting characteristic 24 (compare with FIG. 2) for the second clutch 21 (see block 26 in FIG. 4) is conducted. In Block 5 the reduction function $F_{Ab}$ is determined that increases in a linear fashion over the time t from a starting value 1 at the time $t_1$ to a final value 0 at the time $t_2$. The clutch torque of the first clutch 12 according to the starting characteristic 14 and the reduction function $F_{Ab}$ are multiplied with each other at the junction 17 wherein the product created at the junction 17 equals to the clutch torque $M_{k1}$ of the first clutch 12 during the shifting action. The clutch torque $M_{k2}$ of the second clutch is calculated by a multiplication of the torque according to the starting characteristic 24 and the increasing function $F_{Auf}$ in a junction 27. The increasing function $F_{Auf}$ equals to the difference $1-F_{Ab}$.

Figure 5:
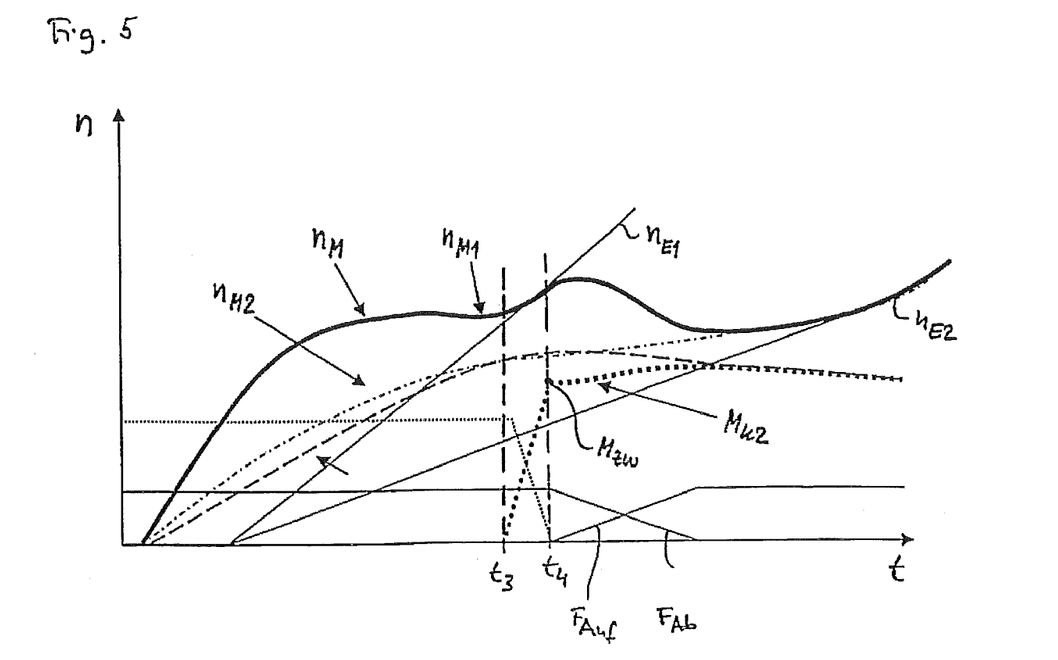
FIG. 5 various rotational speed characteristics during a gear shifting action according to a second embodiment.

FIG. 5 shows the various graphs demonstrating the rotational speed according to a further embodiment of the invention. The significant difference compared to the embodiments shown in FIG. 3 is that the rotational speed $n_M$ of the motor is adapted to the rotational speed $n_{E2}$ of the second input shaft 22 only after a time $t_4$ has passed. Prior to that, in a time period between a time $t_3$ and the time $t_4$ the torque from the first clutch 12 is blended over to the second clutch 22 while, however, the first clutch 12 does not have any slippage and only the second clutch 22 is operated with slippage. Therefore, the second clutch 21 is guided to an intermediate value $M_{zw}$ where the rotational speed $n_M$ of the motor further equals to the rotational speed of the first input shaft 12. Starting from this intermediate value $M_{zw}$ the clutch torque $M_{k2}$ of the second clutch 22 is increased. This is again achieved via the reduction function $F_{Ab}$ and the increasing function $F_{Auf}$ as can be gathered from the flow diagram according to FIG. 6. The functions $F_{Ab}$, $F_{Auf}$ are also in this case dependent on the time t in a linear fashion.

Figure 6:
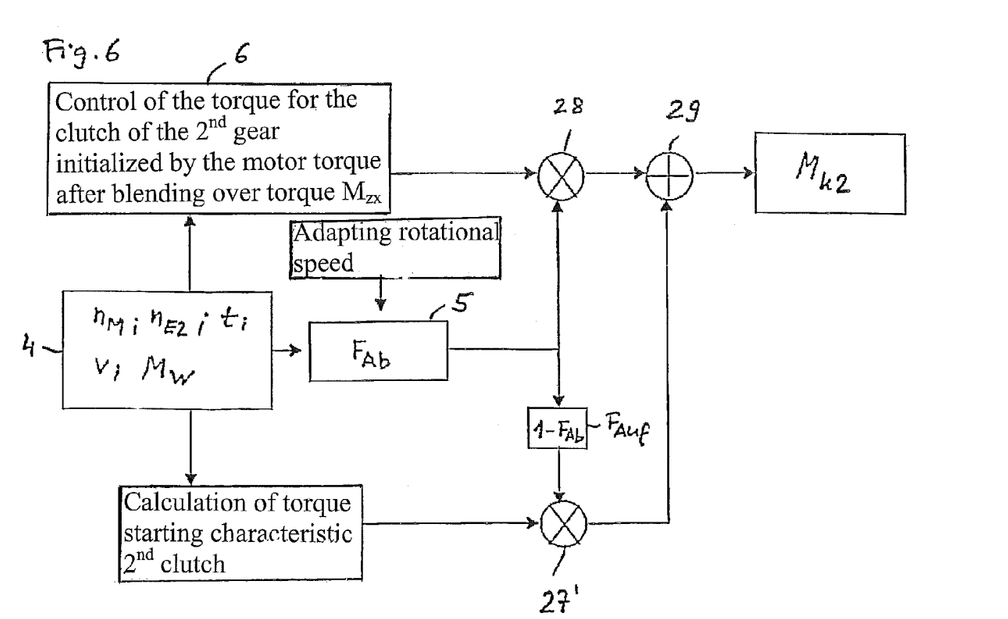
FIG. 6 a block diagram according to the second embodiment.

The clutch torque $M_{k2}$ of the second clutch 21 that has been calculated as shown in the flow diagram according to FIG. 6 is provided for adapting the rotational speed $n_M$ of the motor to the rotational speed $n_{E2}$ of the second input shaft and is determined as the sum of two values: The first value equals to a clutch torque according to the starting characteristic 24 (see block 26') wherein this torque is multiplied with the increasing function $F_{Auf}$ in a junction 27'. The second value is a product from the intermediate value $M_{zw}$ of the torque of the second clutch 22 after blending in with the reduction function $F_{Ab}$ depending on the time t. The intermediate value $M_{zw}$ and the clutch torque according to the starting characteristic 24 can be dependent from the rotational speed $n_M$ of the motor, the rotational speeds $n_{E1}$, $n_{E2}$ of the input shafts 12, 22, the speed v of the vehicle, the time the t and/or the torque $M_w$ as desired by the driver. The multiplication of the intermediate value $M_{zw}$ and the reduction function $F_{Ab}$ is conducted in the FIG. 6 in a junction 28. In a junction 29 the added values are added up wherein the sum equals to the clutch torque $M_{k2}$ of the second clutch 22.

As it can be gathered from FIG. 5, the rotational speed $n_M$ of the motor is adapted starting at the time $t_4$ from the rotational speed $n_{E1}$ of the first input shaft the rotational speed $n_{E2}$ of the second input shaft 22.

LIST OF REFERENCE NUMERALS 1 dual clutch transmission
2 crankshaft
3 motor characteristic
4 block
5 block
6 block
10 first partial transmission
11 first clutch
12 input shaft
13 output shaft
14 starting characteristic
15 intersection point
16 block
17 junction
20 second partial transmission
21 second clutch
22 input shaft
23 output shaft
24 starting characteristic
25 intersection point
26 block
27 block
28 junction
29 junction

The invention claimed is:
1. A method for shifting gears in a dual clutch transmission within a motor vehicle having a motor, the method shifting gears from a starting gear into a target gear with a starting characteristic for the starting gear comprising at the same rotational speed of the motor higher torque values than a starting characteristic of the target gear, wherein the dual clutch transmission comprises a first clutch and a second clutch as well as a first partial transmission and a second partial transmission, wherein the first partial transmission comprises the first clutch and a first group of gears including the starting gear and the second partial transmission comprises the second clutch and a second group of gears including the target gear, said method comprising the following method steps for shifting gears at a predetermined motor load from the starting gear into the target gear:
- a) decreasing a torque transmitting capacity of the first clutch;
- b) increasing a torque transmitting capacity of the second clutch;
- c) adapting the rotational speed of the motor in direction of a rotational speed of an input shaft of the second partial transmission via increasing the torque transmitting capacity of the second clutch; and
- d) controlling the torque transmitting capacity of the second clutch to assume a final torque value where a starting characteristic depending on the target gear and on the rotational speed of the motor intersects with a motor characteristic at a particular motor load.

2. The method according to claim 1, wherein the starting characteristic that depends on the target gear increases continuously with an increase of the rotational speed of the motor and comprises in an intersection point with the motor characteristic a higher gradient than the gradient of that motor characteristic.

3. The method according to claim 1, further comprising the method steps of decreasing the torque transmitting capacity of the first clutch simultaneously with increasing the torque transmitting capacity of the second clutch; and controlling the torque transmitting capacity of the first clutch to assume a value 0 starting from a starting torque value where a starting characteristic that depends on the starting gear and on the rotational speed of the motor intersects the motor characteristic for a predetermined motor load.

4. The method according to claim 3, characterized in that the starting characteristic depending on the starting gear increases continuously with the rotational speed of the motor and has a higher gradient in the intersecting point with the motor characteristic than the gradient of that motor characteristic.

5. The method according to claim 1, further comprising the method step of providing at the start of the shifting process a higher rotational speed of the motor than the rotational speed of an input shaft of the first partial transmission.

6. The method according to claim 1, further comprising the method step of adapting the rotational speed of the motor by starting with increasing the torque transmitting capacity of the second clutch.

7. The method according to claim 1, further comprising the method step of controlling the torque transmitting capacity of the second clutch to equal to a product from a final torque value multiplied with an increasing function that starts with the value 0 and ends in the value 1.

8. The method according to claim 3, further comprising the method step of controlling the torque transmitting capacity of the first clutch to equal to a product from a torque starting value multiplied with a reduction function that starts with the value 1 and ends in the value 0.

9. The method according to claim 7, wherein the increasing function depends in a linear fashion from at least one of the parameters rotational speed of the motor and time.

10. The method according to claim 8, wherein the reduction function depends in a linear fashion from at least one of the parameters rotational speed of the motor and time.

11. The method according to claim 1, further comprising the method step of compensating the influence of torque due to inertia during adapting the rotational speed of the motor by a motor intervention.

12. The method according to claim 1, further comprising the method steps of providing that at the beginning of the shifting process the rotational speed of the motor equals to the rotational speed of the input shaft of the second partial transmission; controlling the torque transmitting capacity of the second clutch at non-adapted rotational speed of the motor to assume an intermediate value; controlling from said intermediate value the torque transmitting capacity of the second clutch further to assume the final torque value of the starting characteristic; and controlling the rotational speed of the motor to assume the rotational speed of the input shaft of the second partial transmission.

13. A motor vehicle comprising:
a motor; and
a dual clutch transmission comprising:
  a first clutch;
  a second clutch;
  a first partial transmission;
  a second partial transmission; and
  a control controlling the first and second clutch during gear shifting action;
wherein the first partial transmission comprises the first clutch and a first group of gears including a starting gear and the second partial transmission comprises the second clutch and a second group of gears including a target gear, wherein a starting characteristic for the starting gear comprises at the same rotational speed of the motor higher torque values than a starting characteristic for the target gear and the control is adapted to shift gears at a predetermined motor load from the starting gear into the target gear by:
- a) decreasing a torque transmitting capacity of the first clutch;
- b) increasing a torque transmitting capacity of the second clutch;
- c) adapting the rotational speed of the motor in direction of a rotational speed of an input shaft of the second partial transmission; and
- d) controlling the torque transmitting capacity of the second clutch to assume a final torque value where a starting characteristic depending on the target gear and on the rotational speed of the motor intersects with a motor characteristic at a particular motor load.

14. The motor vehicle according to claim 13, wherein the starting characteristic that depends on the target gear increases continuously with an increase of the rotational speed of the motor and comprises in an intersection point with the motor characteristic a higher gradient than the gradient of that motor characteristic.

15. The motor vehicle according to claim 13, wherein the control is adapted to increase the torque transmitting capacity of the second clutch simultaneously with decreasing the torque transmitting capacity of the first clutch, wherein the torque transmitting capacity of the first clutch is controlled to assume a value 0 starting from a starting torque value where a starting characteristic that depends on the starting gear and the rotational speed of the motor intersects the motor characteristic for a predetermined motor load.

16. The motor vehicle according to claim 15, wherein the starting characteristic depending on the starting gear increases continuously with the rotational speed of the motor and has a higher gradient in the intersecting point with the motor characteristic than the gradient of that motor characteristic.

17. The motor vehicle according to claim 13, wherein the control is adapted to initiate the start of the shifting process when the rotational speed of the motor is higher than the rotational speed of an input shaft of the first partial transmission.

18. The motor vehicle according to claim 13, wherein the control is adapted to start adapting the rotational speed of the motor with increasing the torque transmitting capacity of the second clutch.

19. The motor vehicle according to claim 13, wherein the control is adapted to verify that at the beginning of the shifting process the rotational speed of the motor equals to the rotational speed of the input shaft of the second partial transmission and is adapted to control the torque transmitting capacity of the second clutch at non-adapted rotational speed of the motor to an intermediate value; to control the torque transmitting capacity of the second clutch further to assume the final torque value of the starting characteristic; and to control the rotational speed of the motor to the rotational speed of the input shaft of the second partial transmission.

\* \* \* \* \*